(12) United States Patent
Li et al.

(10) Patent No.: US 10,123,269 B2
(45) Date of Patent: Nov. 6, 2018

(54) RADIO LINK MONITORING METHOD AND UE

(71) Applicant: Huawei Technologies Co., Ltd., Shenzhen, Guangdong (CN)

(72) Inventors: Hong Li, Beijing (CN); Tong Wu, Shenzhen (CN); Anjian Li, Beijing (CN); Jing Han, Beijing (CN); Jie Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 6 days.

(21) Appl. No.: 15/381,429

(22) Filed: Dec. 16, 2016

(65) Prior Publication Data
US 2017/0150444 A1 May 25, 2017

Related U.S. Application Data

(63) Continuation of application No. PCT/CN2014/080071, filed on Jun. 17, 2014.

(51) Int. Cl.
*H04B 7/185* (2006.01)
*H04W 52/02* (2009.01)
(Continued)

(52) U.S. Cl.
CPC ...... *H04W 52/0225* (2013.01); *H04B 7/0632* (2013.01); *H04W 24/08* (2013.01);
(Continued)

(58) Field of Classification Search
CPC ..... H04W 24/08; H04W 24/10; H04W 56/00; H04W 56/0065; H04W 56/0075;
(Continued)

(56) References Cited

U.S. PATENT DOCUMENTS

2012/0231828 A1 9/2012 Wang et al.
2014/0226650 A1* 8/2014 Miao .................... H04W 24/08
370/350

FOREIGN PATENT DOCUMENTS

CN 1983989 A 6/2007
CN 101584191 A 11/2009
(Continued)

OTHER PUBLICATIONS

"3rd Generation Partnership Project; Technical Specification Group Radio Access Network; Evolved Universal Terrestrial Radio Access (E-UTRA); Requirements for support of radio resource management (Release 12)", 3GPP TS 36.133 V12.3.0, Mar. 2014, 820 pages.
"3rd Generation Partnership Project; Technical Specification Group Radio Access Network; Evolved Universal Terrestrial Radio Access (E-UTRA); Physical layer procedures (Release 12)", 3GPP TS 36.213 V12.1.0, Mar. 2014, 186 pages.

*Primary Examiner* — Shaima Q Aminzay (57) ABSTRACT

Embodiments of the present invention disclose a radio link monitoring method and UE. The radio link monitoring method provided in the embodiments of the present invention includes: monitoring, by user equipment UE, downlink quality of a serving cell on a physical layer by using an extended link monitoring period, where the extended link monitoring period is greater than an original link monitoring period; and sending, by the UE, an in-synchronization indication message or an out-of-synchronization indication message to an upper layer of the UE when a monitoring result satisfies a preset report condition. According to the method in the embodiments of the present invention, power consumption and device costs can be reduced.

8 Claims, 5 Drawing Sheets

(51) Int. Cl.
*H04W 24/08* (2009.01)
*H04W 24/10* (2009.01)
*H04B 7/06* (2006.01)
*H04W 88/02* (2009.01)
*H04W 76/27* (2018.01)

(52) U.S. Cl.
CPC ............ *H04W 24/10* (2013.01); *H04W 76/27* (2018.02); *H04W 88/02* (2013.01); *Y02D 70/00* (2018.01); *Y02D 70/21* (2018.01); *Y02D 70/24* (2018.01); *Y02D 70/26* (2018.01)

(58) Field of Classification Search
CPC . H04W 36/08; H04W 36/22; H04W 56/0095; H04B 7/0632; H04B 17/336
USPC ........... 455/67.11, 13.1, 12.1, 13.2, 15, 502; 342/352; 370/329
See application file for complete search history.

(56) References Cited

FOREIGN PATENT DOCUMENTS

| | | |
|---|---|---|
| CN | 103202050 A | 7/2013 |
| CN | 103428752 A | 12/2013 |
| GB | 2457192 A | 8/2009 |
| WO | 2014/070077 A1 | 5/2014 |

\* cited by examiner

RADIO LINK MONITORING METHOD AND UE

CROSS-REFERENCE TO RELATED APPLICATIONS

This application is a continuation of International Application No. PCT/CN2014/080071, filed on Jun. 17, 2014, the disclosure of which is hereby incorporated by reference in its entirety.

TECHNICAL FIELD

Embodiments of the present invention relate to the field of communications technologies, and in particular, to a radio link monitoring method and UE.

BACKGROUND

Radio link monitoring (Radio Link Monitoring, RLM) refers to that user equipment (User Equipment, UE) monitors radio downlink quality of a serving cell on a physical layer, to indicate an in-synchronization (In-Sync, IN) state or an out-of-synchronization (Out-Of-Sync, OOS) state to an upper layer. The UE evaluates downlink quality on the basis of a reference signal and compares the downlink quality with thresholds $Q_{out}$ and $Q_{in}$. When the evaluated radio link quality is less than the threshold $Q_{out}$, it is determined that a radio link is in an out-of-synchronization state; or when the evaluated radio link quality is greater than the threshold $Q_{in}$, it is determined that a radio link is in an in-synchronization state. The threshold $Q_{out}$ is defined as a radio downlink quality level when the UE cannot perform reliable reception on a radio downlink, which is equivalent to that a block error ratio (Block Error Ratio, BLER) of downlink control channel transmission under an assumed condition is 10%. The threshold $Q_{in}$ is defined as a radio downlink quality level when the UE can perform reliable reception on the radio downlink, which is equivalent to that the block error ratio of the downlink control channel transmission under the assumed condition is 2%.

Currently, a new work item (Work Item, WI) is set up in the 3rd Generation Partnership Project (3rd Generation Partnership Project, 3GPP), and machine-type communication (Machine-Type Communication, MTC) UE that performs one-antenna receiving and that has low costs and increasing coverage is introduced. In existing protocols, requirements for radio link monitoring are all for UE performing dual-antenna receiving, and there is no related definition and research for the MTC UE that performs one-antenna receiving and that has low costs and increasing coverage.

Figure 8:
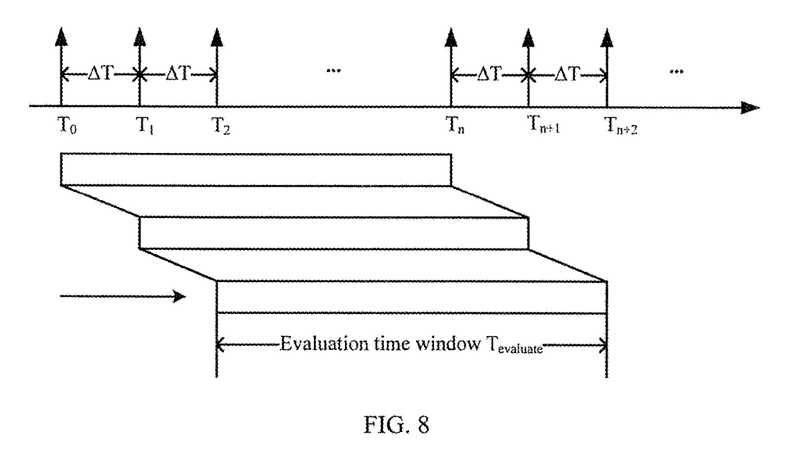
FIG. 8 is a schematic diagram of a radio link monitoring method in the prior art.

In the prior art, a method for performing radio link monitoring by UE performing dual-antenna receiving is shown in FIG. 8. In FIG. 8, the UE needs to monitor downlink quality of a serving cell on a physical layer at an interval of a given time VT, that is, the physical layer of the UE needs to monitor downlink quality of the serving cell at time points $T_0, T_1, T_2, \ldots, T_n, T_{n+1}, T_{n+2}, \ldots$. Evaluation of radio link quality at a given time point by the UE is obtained on the basis of radio link quality in a time window $T_{evaluate}$. For example, the UE needs to evaluate, at a time point $T_n$, downlink quality in a time segment $[T_0, T_n]$ to obtain an evaluation result of link quality corresponding to the time point $T_n$; and the UE needs to evaluate, at a time point $T_{n+1}$, downlink quality in a time segment $[T_1, T_{n+1}]$, to obtain an evaluation result of link quality corresponding to the time point $T_{n+1}$.

In the protocol TS36.213, an evaluation time interval (VT in FIG. 8) is defined as:

in a discontinuous reception (Discontinuous Reception, DRX) mode, a physical layer of UE needs to evaluate downlink quality in each DRX period, that is, the evaluation time interval $\Delta T$=one DRX period; and in a non-DRX mode, the physical layer of the UE needs to evaluate downlink quality in each radio frame, that is, the evaluation time interval $\Delta T$=10 ms.

In the protocol TS36.133, a length of an evaluation time window ($T_{evaluate}$ shown in FIG. 8) is defined as:

in a DRX mode, a length of an in-synchronization/out-of-synchronization evaluation time window is determined by a length of a DRX period;

in a non-DRX mode, for out-of-synchronization monitoring, the length of the evaluation time window is 200 ms; and in a non-DRX mode, for in-synchronization monitoring, the length of the evaluation time window is 100 ms.

At beginning, a link connection is normal, and the physical layer of the UE needs to perform out-of-synchronization monitoring. When an evaluation result of downlink quality is less than the threshold $Q_{out}$, the physical layer of the UE needs to report an out-of-synchronization indication to an upper layer of the UE. After the upper layer of the UE receives N310 consecutive out-of-synchronization indications, the UE needs to enable a timer T310. During enabling of the timer T310, when an evaluation result of downlink quality is greater than the threshold $Q_{in}$, the physical layer of the UE needs to report an in-synchronization indication to the upper layer of the UE.

Figure 9:
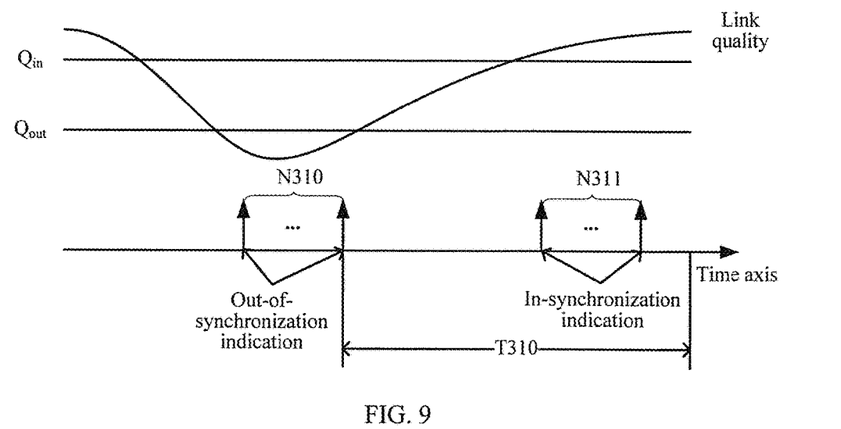
FIG. 9 is a schematic diagram of radio link recovery in the prior art.

If the upper layer of the UE receives N311 consecutive in-synchronization indications before the timer T310 expires (as shown in FIG. 9), it indicates that the downlink recovers normality, and the UE disables the timer T310.

Figure 10:
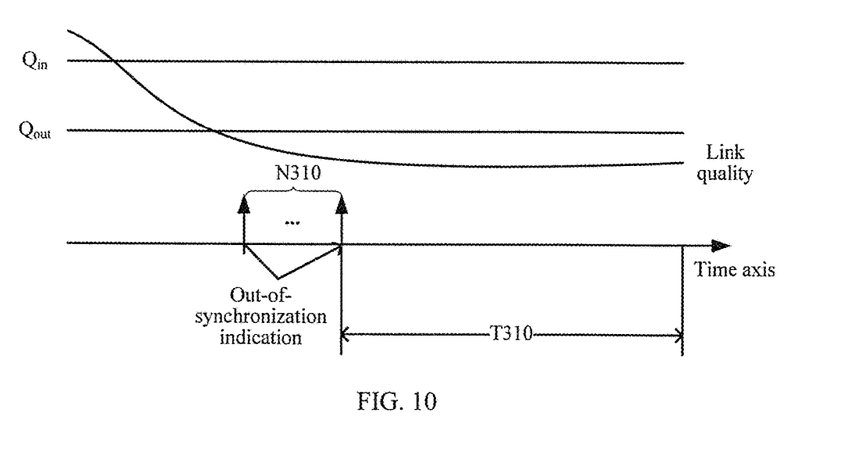
FIG. 10 is a schematic diagram of a radio link failure in the prior art.

If the upper layer of the UE has not received N311 consecutive in-synchronization indications before the timer T310 expires (as shown in FIG. 10), a radio link failure occurs, and the UE needs to send a radio link failure indication to the serving cell.

A minimum time interval at which two consecutive in-synchronization/out-of-synchronization indication messages are sent in FIG. 9 and FIG. 10 is:

in a DRX mode, the minimum time interval is one DRX period; and in a non-DRX mode, the minimum time interval is 10 ms.

That is, in the existing protocols, for the UE performing dual-antenna receiving, in the non-DRX mode, the physical layer of the UE needs to evaluate downlink quality in each radio frame, that is, evaluate link quality every 10 ms. For the MTC UE having low costs, one of the most important requirements is "lowest cost (Lowest Cost)". However, if an evaluation period of 10 ms is directly used for the MTC UE having low costs, excessive power consumption is inevitably caused, which is contrary to a main objective "lowest costs" of the WI. Therefore, it is necessary to provide a new monitoring method to resolve the foregoing problem.

SUMMARY

In view of this, embodiments of the present invention provide a radio link monitoring method and UE, to reduce power consumption and device costs.

A first aspect of the embodiments of the present invention provides a radio link monitoring method, including:

monitoring, by user equipment UE, downlink quality of a serving cell on a physical layer by using an extended link monitoring period, where the extended link monitoring period is greater than an original link monitoring period; and sending, by the UE, an in-synchronization indication message or an out-of-synchronization indication message to an upper layer of the UE when a monitoring result satisfies a preset report condition.

With reference to the first aspect of the embodiments of the present invention, in a first implementation manner of the first aspect of the embodiments of the present invention, the monitoring, by UE, downlink quality of a serving cell on a physical layer by using an extended link monitoring period includes out-of-synchronization monitoring and in-synchronization monitoring, where when performing out-of-synchronization monitoring, the UE evaluates downlink quality of the serving cell that is detected in a first extended time window by using the extended link monitoring period, to obtain a monitoring result, where a length of the first extended time window is greater than a length of a first original time window; and when performing in-synchronization monitoring, the UE evaluates downlink quality of the serving cell that is detected in a second extended time window by using the extended link monitoring period, to obtain a monitoring result, where a length of the second extended time window is greater than a length of a second original time window.

With reference to the first aspect of the embodiments of the present invention, or the first implementation manner of the first aspect, in a second implementation manner of the first aspect of the embodiments of the present invention, a minimum time interval at which the UE sends two consecutive in-synchronization indication messages or out-of-synchronization indication messages is an extended minimum time interval, and the extended minimum time interval is greater than an original minimum time interval.

With reference to the second implementation manner of the first aspect of the embodiments of the present invention, in a third implementation manner of the first aspect of the embodiments of the present invention, the extended link monitoring period, the first extended time window, the second extended time window, and the extended minimum time interval are preset by the UE itself.

With reference to the second implementation manner of the first aspect of the embodiments of the present invention, in a fourth implementation manner of the first aspect of the embodiments of the present invention, the extended link monitoring period, the first extended time window, the second extended time window, and the extended minimum time interval are set by a network side device according to a device type indication message reported by the UE and are notified to the UE by using a radio resource control RRC message.

With reference to the first aspect of the embodiments of the present invention, the first implementation manner of the first aspect, the second implementation manner of the first aspect, the third implementation manner of the first aspect, or the fourth implementation manner of the first aspect, in a fifth implementation manner of the first aspect of the embodiments of the present invention, the sending, by the UE, an in-synchronization indication message or an out-of-synchronization indication message to an upper layer of the UE when a monitoring result satisfies a preset report condition includes:

sending, by the UE, the in-synchronization indication message or the out-of-synchronization indication message to the upper layer of the UE each time when a monitoring result satisfies the preset report condition; or sending, by the UE, the in-synchronization indication message or the out-of-synchronization indication message to the upper layer of the UE once when monitoring results of the UE during a preset quantity of times of continuous monitoring are the same and all satisfy the preset report condition.

A second aspect of the embodiments of the present invention provides user equipment UE, including:

a monitoring unit, configured to monitor downlink quality of a serving cell on a physical layer of the UE by using an extended link monitoring period, where the extended link monitoring period is greater than an original link monitoring period; and a sending unit, configured to send an in-synchronization indication message or an out-of-synchronization indication message to an upper layer of the UE when a monitoring result of the monitoring unit satisfies a preset report condition.

With reference to the second aspect of the embodiments of the present invention, in a first implementation manner of the second aspect of the embodiments of the present invention, that the monitoring unit monitors downlink quality of a serving cell includes out-of-synchronization monitoring and in-synchronization monitoring, and the monitoring unit includes:

a first monitoring unit, configured to: when performing out-of-synchronization monitoring, evaluate downlink quality of the serving cell that is detected in a first extended time window by using the extended link monitoring period, to obtain a monitoring result, where a length of the first extended time window is greater than a length of a first original time window; and a second monitoring unit, configured to: when performing in-synchronization monitoring, evaluate downlink quality of the serving cell that is detected in a second extended time window by using the extended link monitoring period, to obtain a monitoring result, where a length of the second extended time window is greater than a length of a second original time window.

With reference to the second aspect of the embodiments of the present invention, or the first implementation manner of the second aspect, in a second implementation manner of the second aspect of the embodiments of the present invention, a minimum time interval at which the sending unit sends two consecutive in-synchronization indication messages or out-of-synchronization indication messages is an extended minimum time interval, and the extended minimum time interval is greater than an original minimum time interval.

With reference to the second implementation manner of the second aspect of the embodiments of the present invention, in a third implementation manner of the second aspect of the embodiments of the present invention, the UE further includes:

a setting unit, configured to preset the extended link monitoring period, the first extended time window, the second extended time window, and the extended minimum time interval.

With reference to the second implementation manner of the second aspect of the embodiments of the present invention, in a fourth implementation manner of the second aspect of the embodiments of the present invention, the sending unit is further configured to report a device type indication message to a network side device; and the UE further includes:

a receiving unit, configured to receive, from the network side device, the extended link monitoring period, the first extended time window, the second extended time window, and the extended minimum time interval that are set by the network side device according to the device type indication message reported by the sending unit and that are sent to the UE by using a radio resource control RRC message.

With reference to the second aspect of the embodiments of the present invention, the first implementation manner of the second aspect, the second implementation manner of the second aspect, the third implementation manner of the second aspect, or the fourth implementation manner of the second aspect, in a fifth implementation manner of the second aspect of the embodiments of the present invention, the sending unit is specifically configured to:

send the in-synchronization indication message or the out-of-synchronization indication message to the upper layer of the UE each time when a monitoring result of the monitoring unit satisfies the preset report condition; or send the in-synchronization indication message or the out-of-synchronization indication message to the upper layer of the UE once when monitoring results of the monitoring unit during a preset quantity of times of continuous monitoring are the same and all satisfy the preset report condition.

A third aspect of the embodiments of the present invention provides another user equipment UE, including:

a processor, configured to monitor downlink quality of a serving cell on a physical layer of the UE by using an extended link monitoring period, where the extended link monitoring period is greater than an original link monitoring period; and a transmitter, configured to send an in-synchronization indication message or an out-of-synchronization indication message to an upper layer of the UE when a monitoring result of the processor satisfies a preset report condition.

With reference to the third aspect of the embodiments of the present invention, in a first implementation manner of the third aspect of the embodiments of the present invention, that the processor monitors downlink quality of a serving cell on a physical layer by using an extended link monitoring period includes out-of-synchronization monitoring and in-synchronization monitoring, where when performing out-of-synchronization monitoring, the processor evaluates downlink quality of the serving cell that is detected in a first extended time window by using the extended link monitoring period, to obtain a monitoring result, where a length of the first extended time window is greater than a length of a first original time window; and when performing in-synchronization monitoring, the processor evaluates downlink quality of the serving cell that is detected in a second extended time window by using the extended link monitoring period, to obtain a monitoring result, where a length of the second extended time window is greater than a length of a second original time window.

With reference to the third aspect of the embodiments of the present invention, or the first implementation manner of the third aspect, in a second implementation manner of the third aspect of the embodiments of the present invention, a minimum time interval at which the transmitter sends two consecutive in-synchronization indication messages or out-of-synchronization indication messages is an extended minimum time interval, and the extended minimum time interval is greater than an original minimum time interval.

With reference to the second implementation manner of the third aspect of the embodiments of the present invention, in a third implementation manner of the third aspect of the embodiments of the present invention, the processor is further configured to:

preset the extended link monitoring period, the first extended time window, the second extended time window, and the extended minimum time interval.

With reference to the second implementation manner of the third aspect of the embodiments of the present invention, in a fourth implementation manner of the third aspect of the embodiments of the present invention, the transmitter is further configured to report a device type indication message to a network side device; and the UE further includes a receiver, where the receiver is configured to receive, from the network side device, the extended link monitoring period, the first extended time window, the second extended time window, and the extended minimum time interval that are set by the network side device according to the device type indication message reported by the transmitter and that are sent to the UE by using a radio resource control RRC message.

With reference to the third aspect of the embodiments of the present invention, the first implementation manner of the third aspect, the second implementation manner of the third aspect, the third implementation manner of the third aspect, or the fourth implementation manner of the third aspect, in a fifth implementation manner of the third aspect of the embodiments of the present invention, the transmitter is specifically configured to:

send the in-synchronization indication message or the out-of-synchronization indication message to the upper layer of the UE each time when a monitoring result of the processor satisfies the preset report condition; or send the in-synchronization indication message or the out-of-synchronization indication message to the upper layer of the UE once when monitoring results of the processor during a preset quantity of times of continuous monitoring are the same and all satisfy the preset report condition.

As can be seen from the foregoing technical solutions, the embodiments of the present invention have the following advantages:

In the embodiments of the present invention, UE monitors downlink quality of a serving cell on a physical layer by using an extended link monitoring period, where the extended link monitoring period is greater than an original link monitoring period; and the UE sends an in-synchronization indication message or an out-of-synchronization indication message to an upper layer of the UE when a monitoring result satisfies a preset report condition. In the embodiments of the present invention, because an extended link monitoring period is used to perform link monitoring, that is, a radio link monitoring period is increased and a monitoring frequency is reduced, power consumption and device costs can be reduced.

BRIEF DESCRIPTION OF THE DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION

Embodiments of the present invention provide a radio link monitoring method and UE, to reduce power consumption and device costs. When UE is in a DRX mode, a related time involved in a monitoring process is determined by a DRX period of the UE. Therefore, the following embodiments mainly describe UE in a non-DRX mode.

Figure 1:
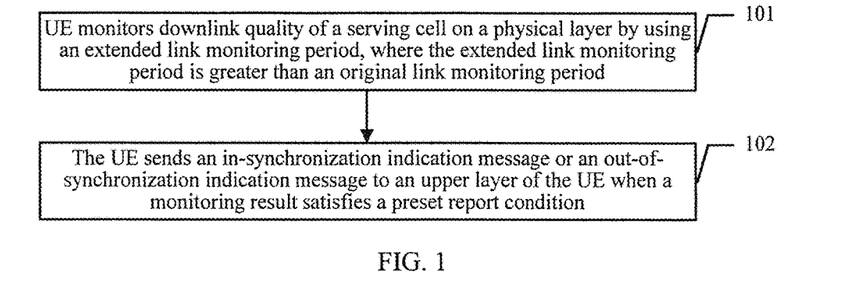
FIG. 1 is a schematic diagram of an embodiment of a radio link monitoring method according to the present invention.

Referring to FIG. 1, an embodiment of a radio link monitoring method in the present invention includes:

101: UE monitors downlink quality of a serving cell on a physical layer by using an extended link monitoring period, where the extended link monitoring period is greater than an original link monitoring period.

In this embodiment, the original link monitoring period is a link monitoring period that is stipulated in an existing protocol and that is used when radio link monitoring is performed for UE performing dual-antenna receiving, and as described in the background, the original link monitoring period may be 10 ms. Specifically, in this embodiment, a used link monitoring period is an extended link monitoring period, and the extended link monitoring period is greater than 10 ms.

102: The UE sends an in-synchronization indication message or an out-of-synchronization indication message to an upper layer of the UE when a monitoring result satisfies a preset report condition.

In a specific implementation, the preset report condition may be preset by the UE. For example, when the monitoring result is less than a threshold $Q_{out}$, the out-of-synchronization indication message is sent to the upper layer of the UE; and when the monitoring result is greater than a threshold $Q_{in}$, the in-synchronization indication message is sent to the upper layer of the UE. The threshold $Q_{out}$ is defined as a radio downlink quality level when the UE cannot perform reliable reception on a radio downlink, which is equivalent to that a block error ratio (Block Error Ratio, BLER) of downlink control channel transmission under an assumed condition is 10%. The threshold $Q_{in}$ is defined as a radio downlink quality level when the UE can perform reliable reception on the radio downlink, which is equivalent to that the block error ratio of the downlink control channel transmission under the assumed condition is 2%.

The following describes the radio link monitoring method in the present invention by using a specific embodiment.

Generally, radio link monitoring includes out-of-synchronization monitoring and in-synchronization monitoring. In an initial status, a radio link usually is in an in-synchronization state. Therefore, out-of-synchronization monitoring needs to be performed first.

Figure 2:
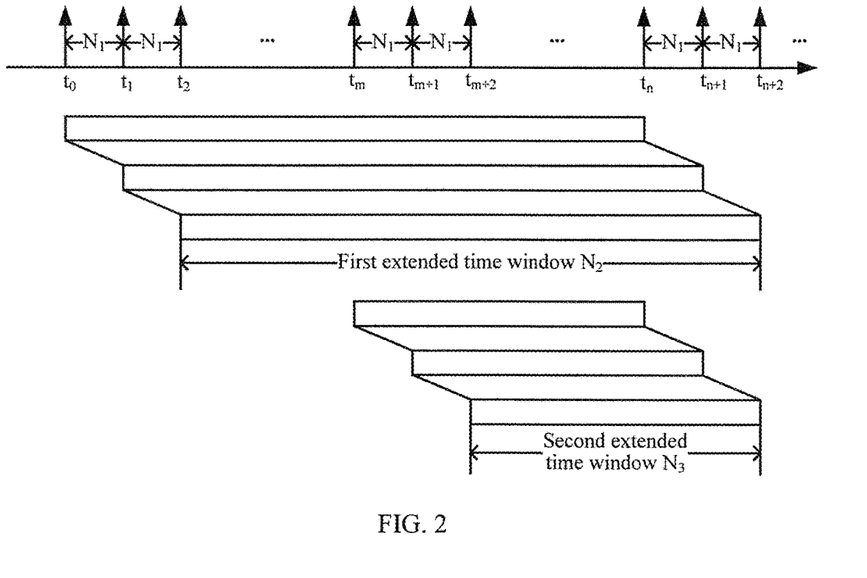
FIG. 2 is a schematic diagram of another embodiment of a radio link monitoring method according to the present invention.

Specifically, referring to FIG. 2, in this embodiment, the used link monitoring period is the extended link monitoring period that is represented by $N_1$, where $N_1$ is greater than 10 ms, that is, the UE monitors downlink quality of the serving cell on the physical layer every $N_1$ ms. As shown in FIG. 2, the physical layer of the UE needs to monitor downlink quality of the serving cell at time points $t_0, t_1, t_2, \ldots, t_m, t_{m+1}, t_{m+2}, \ldots t_n, t_{n+1}, t_{n+2}$, and a time interval of every two continuous monitoring operations is $N_1$ ms. Because out-of-synchronization monitoring needs to be performed at this time, downlink quality of the serving cell detected by using the extended link monitoring period $N_1$ in a first extended time window needs to be evaluated, to obtain a monitoring result. In this embodiment, the first extended time window is represented by $N_2$, where $N_2$ is greater than 200 ms. For example, when a monitoring result at a time point $t_n$ needs to be acquired, downlink quality detected in a time segment $[t_0, t_n]$ needs to be evaluated, to obtain a monitoring result, and when the monitoring result is less than the threshold $Q_{out}$, the physical layer of the UE reports the out-of-synchronization indication message to the upper layer of the UE. After the upper layer of the UE receives N310 consecutive out-of-synchronization indication messages, in-synchronization monitoring needs to be performed.

When performing in-synchronization monitoring, the UE needs to enable a timer T310. A specific monitoring method is: evaluating downlink quality of the serving cell that is detected by using the extended monitoring period $N_1$ in a second extended time window, to obtain a monitoring result. In this embodiment, the second extended time window is represented by $N_3$, where $N_3$ is greater than 100 ms. During enabling of the timer T310, if the obtained monitoring result is greater than the threshold $Q_{in}$, the physical layer of the UE needs to report the in-synchronization indication message to the upper layer of the UE.

If the upper layer of the UE receives N311 consecutive in-synchronization indication messages before the timer T310 expires, it indicates that the downlink recovers normality, and the UE disables the timer T310.

If the upper layer of the UE has not received N311 consecutive in-synchronization indication messages before the timer T310 expires, a radio link failure occurs, and the UE needs to send a radio link failure indication message to the serving cell.

Figure 3:
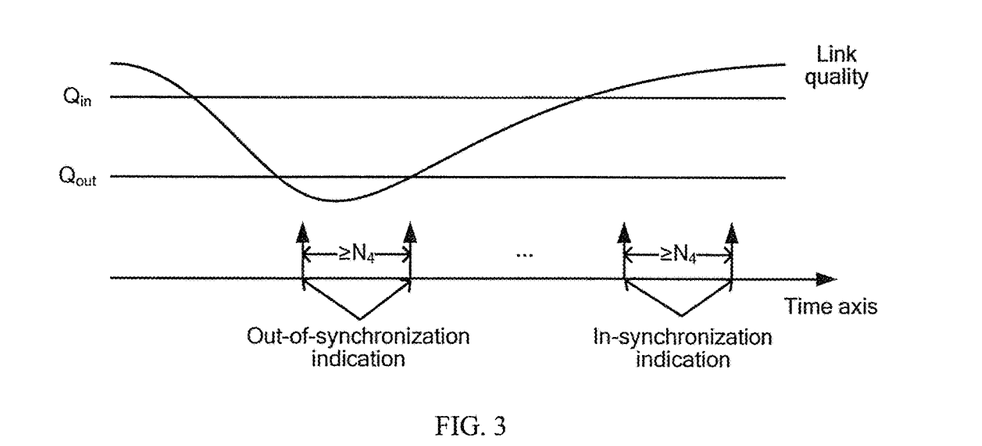
FIG. 3 is a schematic diagram of an embodiment of in-synchronization indication and out-of-synchronization indication according to the present invention.

In addition, in this embodiment, a minimum time interval at which the physical layer of the UE sends two consecutive in-synchronization indication messages or out-of-synchronization indication messages to the upper layer is an extended minimum time interval $N_4$, and as shown in FIG. 3, the extended minimum time interval $N_4$ is greater than an original minimum time interval 10 ms.

In specific implementation, the UE may send the in-synchronization indication message or the out-of-synchronization indication message to the upper layer of the UE each time when a monitoring result satisfies the preset report condition, that is, when a monitoring result is greater than $Q_{in}$ or less than $Q_{out}$. Alternatively, the UE may perform monitoring continuously for N times (N may be preset), and the UE sends the in-synchronization indication message or the out-of-synchronization indication message to the upper layer of the UE once when N consecutive monitoring results are the same and all satisfy the preset report condition, to further reduce power consumption.

In specific implementation, the foregoing $N_1$, $N_2$, $N_3$, and $N_4$ may be preset by the UE itself. For example, in the protocols TS36.213 and TS36.133, a parameter related to a radio link monitoring operation of MTC UE having low costs is defined.

In addition, the foregoing four parameters may be set by a network side device (for example, a base station eNB) according to a device type indication message sent by the UE and then are notified to the UE by using a radio resource control (Radio Resource Control, RRC) message. A specific implementation process in which the UE sends the device type indication message to the network side device may be as follows:

```
-- ASN1START
    MachineTypeIndication ::=           SEQUENCE {
        criticalExtensions              CHOICE {
            c1                          CHOICE {
                machineTypeIndication
MachineTypeIndication-IEs,
                spare3 NULL, spare2 NULL, spare1 NULL
            },
            criticalExtensionsFuture    SEQUENCE { }
        }
    }
    MachineTypeIndication-IEs ::=       SEQUENCE {
        machineType                     ENUMERATED {type1,
                                          type2, ...},
        carrierFreq                     CHOICE {
            eutra                       ARFCN-ValueEUTRA,
            ...,
        },
        lateNonCriticalExtension        OCTET STRING
                                          OPTIONAL,
        nonCriticalExtension            SEQUENCE { }
                                          OPTIONAL
    }
-- ASN1STOP
```

The "type 1" and the "type 2" in signaling enumeration may refer to a device type, for example, intelligent meter reading or a wearable device.

The network side device performs configuration according to a device type indicated by the device type indication message and notifies the configuration to the UE by using RRC signaling. A specific implementation process may be as follows:

```
-- ASN1START
    RLM-LowCostConfig ::=    CHOICE {
        release              NULL,
        setup                SEQUENCE {
            evaluation-period    ENUMERATED {
                ms20, ms40, ms80, ms160, ms320,
ms640, ms1280,
                                     spare8, spare7, spare6, spare5,
spare4, spare3,
                                     spare2, spare1},
            OOS-period           ENUMERATED {
                ms400, ms800, ms1600, ms3200,
ms6400, ms12800,
                                     spare8, spare7, spare6, spare5,
spare4, spare3,
                                     spare2, spare1},
            IN-period            ENUMERATED {
                ms200, ms400, ms800, ms1600,
ms3200, ms6400,
                                     spare8, spare7, spare6, spare5,
spare4, spare3,
```
            MinReport-period     ENUMERATED {
                ms20, ms40, ms80, ms160, ms320,
ms640, ms1280,
                                     spare8, spare7, spare6, spare5,
spare4, spare3,
                                     spare2, spare1},
            ...
        }
    }
-- ASN1STOP
```

The "evaluation-period", the "OOS-period", the "IN-period", and the "MinReport-period" in signaling enumeration respectively correspond to the foregoing parameters $N_1$, $N_2$, $N_3$, and $N_4$.

In addition, it should be noted that this embodiment is described by using an example in which when a link monitoring period changes, a monitoring time window also changes accordingly. In an actual application, a monitoring time window may not change as a link monitoring period changes.

For example, in the prior art, link quality monitoring is performed every 10 ms. When out-of-synchronization monitoring is performed, a used time window is 200 ms, that is, link quality at a current given time point is evaluated by selecting 20 pieces of data detected within 200 ms from the current given time point. When in-synchronization monitoring is performed, a used time window is 100 ms, that is, link quality at a current given time point is evaluated by selecting 10 pieces of data detected within 100 ms from the current given time point. Specifically, in this embodiment, a link monitoring period is increased. For example, link quality monitoring is performed every 20 ms, and correspondingly, a time window of out-of-synchronization monitoring may be 400 ms. Then, when out-of-synchronization evaluation is performed on link quality at a given time point, an amount of selected data is still 20, and a time window of in-synchronization monitoring may be 200 ms; and when in-synchronization evaluation is performed on link quality at a given time point, an amount of selected data is still 10, thereby ensuring that power consumption is reduced in a case in which accuracy of a monitoring result is not reduced. Certainly, in a case in which a link monitoring period is 20 ms, a time window of out-of-synchronization monitoring may still be 200 ms, and a time window of in-synchronization monitoring may still be 100 ms. In this way, an amount of data selected during evaluation is reduced, which reduces accuracy of the monitoring result to some extent, but can still reduce power consumption. In an actual application, which method is specifically used may be determined according to an actual status, which is not limited herein.

In this embodiment, a network side device sets an extended link monitoring period, a first extended time window, a second extended time window, and an extended minimum time interval for UE according to a device type indication message sent by the UE, or the UE itself may preset these parameters; then, the UE monitors downlink quality of a serving cell on a physical layer by using the extended link monitoring period; and when a monitoring result satisfies a preset report condition, the UE sends an in-synchronization indication message or an out-of-synchronization indication message to an upper layer of the UE by using the extended minimum time interval. In this embodiment, because an extended link monitoring period is used to perform link monitoring, that is, a radio link monitoring period is increased and a monitoring frequency is reduced, power consumption and device costs can be reduced.

Figure 4:
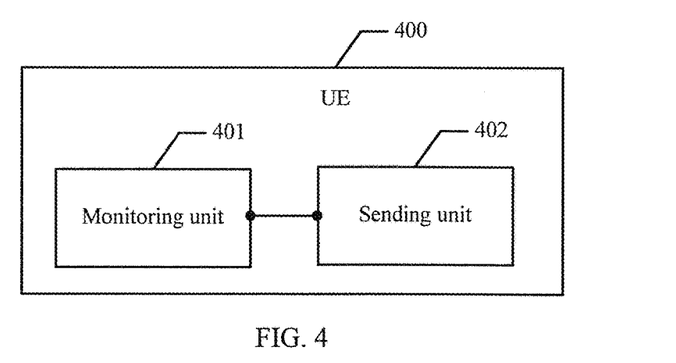
FIG. 4 is a schematic diagram of an embodiment of UE according to the present invention.

The following describes UE in the embodiments of the present invention. Referring to FIG. 4, UE 400 in this embodiment includes:

a monitoring unit 401, configured to monitor downlink quality of a serving cell on a physical layer of the UE by using an extended link monitoring period, where the extended link monitoring period is greater than an original link monitoring period; and a sending unit 402, configured to send an in-synchronization indication message or an out-of-synchronization indication message to an upper layer of the UE when a monitoring result of the monitoring unit 401 satisfies a preset report condition.

Figure 5:
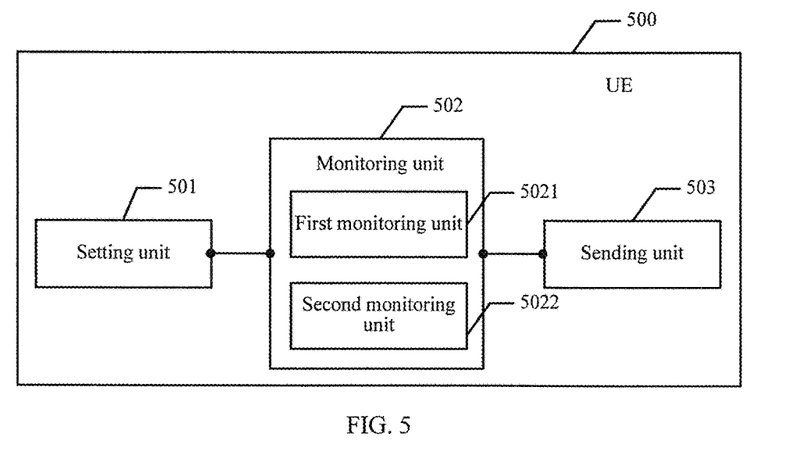
FIG. 5 is a schematic diagram of another embodiment of UE according to the present invention.

For the convenience of understanding, the following describes the UE in the embodiments of the present invention by using a specific embodiment. Referring to FIG. 5, UE 500 includes:

a setting unit 501, configured to set an extended link monitoring period, a first extended time window, a second extended time window, and an extended minimum time interval;

a monitoring unit 502, configured to monitor downlink quality of a serving cell on a physical layer of the UE by using the extended link monitoring period set by the setting unit 501, where the extended link monitoring period is greater than an original link monitoring period, where specifically, the monitoring unit 502 includes a first monitoring unit 5021 and a second monitoring unit 5022, where the first monitoring unit 5021 is configured to: when performing out-of-synchronization monitoring, evaluate downlink quality of the serving cell that is detected in the first extended time window by using the extended link monitoring period set by the setting unit 501, to obtain a monitoring result, where a length of the first extended time window is greater than a length of a first original time window; and the second monitoring unit 5022 is configured to: when performing in-synchronization monitoring, evaluate downlink quality of the serving cell that is detected in the second extended time window by using the extended link monitoring period set by the setting unit 501, to obtain a monitoring result, where a length of the second extended time window is greater than a length of a second original time window; and a sending unit 503, configured to send an in-synchronization indication message or an out-of-synchronization indication message to an upper layer of the UE when the monitoring result satisfies a preset report condition, where a minimum time interval at which the sending unit 503 sends two consecutive in-synchronization indication messages or out-of-synchronization indication messages is the extended minimum time interval set by the setting unit 501, and the extended minimum time interval is greater than an original minimum time interval.

In this embodiment, the setting unit of the UE itself sets an extended link monitoring period, a first extended time window, a second extended time window, and an extended minimum time interval; then, the monitoring unit monitors downlink quality of a serving cell on a physical layer by using the extended link monitoring period; and when a monitoring result satisfies a preset report condition, the sending unit sends an in-synchronization indication message or an out-of-synchronization indication message to an upper layer of the UE by using the extended minimum time interval. In this embodiment, because an extended link monitoring period is used to perform link monitoring, that is, a radio link monitoring period is increased and a monitoring frequency is reduced, power consumption and device costs can be reduced.

Figure 6:
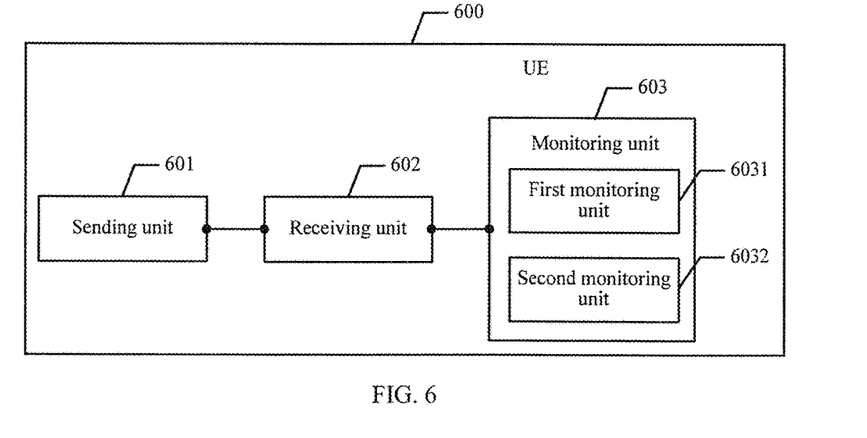
FIG. 6 is a schematic diagram of another embodiment of UE according to the present invention.

The following describes another specific embodiment of UE in the present invention. Referring to FIG. 6, UE 600 in this embodiment includes:

a sending unit 601, configured to report a device type indication message to a network side device;

a receiving unit 602, configured to receive, from the network side device, an extended link monitoring period, a first extended time window, a second extended time window, and an extended minimum time interval that are set by the network side device according to the device type indication message reported by the sending unit 601 and that are sent to the UE by using a radio resource control RRC message; and a monitoring unit 603, configured to monitor downlink quality of a serving cell on a physical layer of the UE by using the extended link monitoring period, where the extended link monitoring period is greater than an original link monitoring period.

Specifically, the monitoring unit 603 includes a first monitoring unit 6031 and a second monitoring unit 6032, where the first monitoring unit 6031 is configured to: when performing out-of-synchronization monitoring, evaluate downlink quality of the serving cell that is detected in the first extended time window by using the extended link monitoring period, to obtain a monitoring result, where a length of the first extended time window is greater than a length of a first original time window; and the second monitoring unit 6032 is configured to: when performing in-synchronization monitoring, evaluate downlink quality of the serving cell that is detected in the second extended time window by using the extended link monitoring period, to obtain a monitoring result, where a length of the second extended time window is greater than a length of a second original time window.

The sending unit 601 is further configured to send an in-synchronization indication message or an out-of-synchronization indication message to an upper layer of the UE when the monitoring result satisfies a preset report condition, where a minimum time interval at which the sending unit 601 sends two consecutive in-synchronization indication messages or out-of-synchronization indication messages is the extended minimum time interval, and the extended minimum time interval is greater than an original minimum time interval.

For the convenience of understanding, the following describes a manner of interaction between the units of the UE in this embodiment by using an actual application scenario. This embodiment is mainly described by using a related parameter required for a process in which a network side device configures monitoring for UE as an example. Specific details are as follows:

First, the sending unit 601 sends the device type indication message to the network side device, to request the network side device to configure a related parameter for the UE. A specific implementation manner may be as follows:

```
-- ASN1START
MachineTypeIndication ::=                SEQUENCE {
    criticalExtensions               CHOICE {
        c1                       CHOICE {
            machineTypeIndication
```

-continued

```
MachineTypeIndication-IEs,
        spare3 NULL, spare2 NULL, spare1 NULL
    },
        criticalExtensionsFuture       SEQUENCE { }
    }
}
MachineTypeIndication-IEs ::=          SEQUENCE {
    machineType                        ENUMERATED {type1,
                                       type2, ...},
    carrierFreq                        CHOICE {
    eutra                              ARFCN-ValueEUTRA,
    ...,
    },
    lateNonCriticalExtension           OCTET STRING
        OPTIONAL,
    nonCriticalExtension               SEQUENCE { }
        OPTIONAL
}
-- ASN1STOP
```

The "type 1" and the "type 2" in signaling enumeration may refer to a device type, for example, intelligent meter reading or a wearable device.

The network side device performs configuration according to a device type indicated by the device type indication message and notifies the configuration to the UE by using RRC signaling. A specific implementation process may be as follows:

```
-- ASN1START
RLM-LowCostConfig ::=    CHOICE {
    release              NULL,
    setup                SEQUENCE {
    evaluation-period    ENUMERATED {
                         ms20, ms40, ms80, ms160, ms320,
ms640, ms1280,
                         spare8, spare7, spare6, spare5,
spare4, spare3,
                         spare2, spare1},
    OOS-period           ENUMERATED {
                         ms400, ms800, ms1600, ms3200,
ms6400, ms12800,
                         spare8, spare7, spare6, spare5,
spare4, spare3,
                         spare2, spare1},
    IN-period            ENUMERATED {
                         ms200, ms400, ms800, ms1600,
ms3200, ms6400,
                         spare8, spare7, spare6, spare5,
spare4, spare3,
                         spare2, spare1},
    MinReport-period     ENUMERATED {
                         ms20, ms40, ms80, ms160, ms320,
ms640, ms1280,
                         spare8, spare7, spare6, spare5,
spare4, spare3,
                         spare2, spare1},
    ...
    }
}
-- ASN1STOP
```

The "evaluation-period", the "OOS-period", the "IN-period", and the "MinReport-period" in signaling enumeration respectively correspond to the extended link monitoring period $N_1$, the first extended time window $N_2$, the second extended time window $N_3$, and the extended minimum time interval $N_4$, and the receiving unit 602 receives these parameters configured by the network side device.

The monitoring unit 603 monitors downlink quality of the serving cell by using the extended link monitoring period $N_1$. Generally, radio link monitoring includes out-of-synchronization monitoring and in-synchronization monitoring.

In an initial status, a radio link usually is in an in-synchronization state. Therefore, out-of-synchronization monitoring needs to be performed first.

As shown in FIG. 2, when performing out-of-synchronization monitoring, the first monitoring unit 6031 monitors downlink quality of the serving cell on the physical cell every $N_1$ ms, that is, the first monitoring unit 6031 needs to monitor downlink quality of the serving cell at time points $t_0, t_1, t_2, \ldots t_m, t_{m+1}, t_{m+2}, \ldots, t_n, t_{n+1}, t_{n+2}$, and a time interval of every two continuous monitoring operations is $N_1$ ms, where $N_1$ is greater than 10 ms. Because out-of-synchronization monitoring needs to be performed at this time, the first monitoring unit 6031 needs to evaluate downlink quality of the serving cell that is detected by using the extended link monitoring period $N_1$ in the first extended time window $N_2$, to obtain a monitoring result, where $N_2$ is greater than 200 ms. For example, when a monitoring result at a time point $t_n$ needs to be acquired, downlink quality detected in a time segment $[t_0, t_n]$ needs to be evaluated, to obtain a monitoring result, and when the monitoring result is less than the threshold $Q_{out}$, the sending unit 601 reports the out-of-synchronization indication message to the upper layer of the UE. After the upper layer of the UE receives N310 consecutive out-of-synchronization indication messages, the second monitoring unit 6032 needs to perform in-synchronization monitoring.

When performing in-synchronization monitoring, the second monitoring unit 6032 needs to enable a timer T310. A specific monitoring method is: evaluating downlink quality of the serving cell that is detected by using the extended monitoring period $N_1$ in the second extended time window $N_3$, to obtain a monitoring result, where $N_3$ is greater than 100 ms. During enabling of the timer T310, if the obtained monitoring result is greater than the threshold $Q_{in}$, the sending unit 601 needs to report the in-synchronization indication message to the upper layer of the UE.

If the upper layer of the UE receives N311 consecutive in-synchronization indication messages before the timer T310 expires, it indicates that the downlink recovers normality, and the second monitoring unit 6032 disables the timer T310.

If the upper layer of the UE has not received N311 consecutive in-synchronization indication messages before the timer T310 expires, a radio link failure occurs, and the sending unit 601 needs to send a radio link failure indication message to the serving cell.

In addition, in this embodiment, a minimum time interval at which the sending unit 601 sends two consecutive in-synchronization indication messages or out-of-synchronization indication messages to the upper layer of the UE is an extended minimum time interval $N_4$ and as shown in FIG. 3, the extended minimum time interval $N_4$ is greater than an original minimum time interval 10 ms.

In specific implementation, the sending unit 601 may send the in-synchronization indication message or the out-of-synchronization indication message to the upper layer of the UE each time when a monitoring result satisfies the preset report condition, that is, when a monitoring result is greater than $Q_{in}$ or less than $Q_{out}$. Alternatively, the sending unit 601 may perform monitoring continuously for N times (N may be preset), and the sending unit 601 sends the in-synchronization indication message or the out-of-synchronization indication message to the upper layer of the UE once when N consecutive monitoring results are the same and all satisfy the preset report condition, to further reduce power consumption.

In addition, it should be noted that this embodiment is described by using an example in which when a link monitoring period changes, a monitoring time window also changes accordingly. In an actual application, a monitoring time window may not change as a link monitoring period changes.

For example, in the prior art, link quality monitoring is performed every 10 ms. When out-of-synchronization monitoring is performed, a used time window is 200 ms, that is, link quality at a current given time point is evaluated by selecting 20 pieces of data detected within 200 ms from the current given time point. When in-synchronization monitoring is performed, a used time window is 100 ms, that is, link quality at a current given time point is evaluated by selecting 10 pieces of data detected within 100 ms from the current given time point. Specifically, in this embodiment, a link monitoring period is increased. For example, link quality monitoring is performed every 20 ms, and correspondingly, a time window of out-of-synchronization monitoring may be 400 ms. Then, when out-of-synchronization evaluation is performed on link quality at a given time point, an amount of selected data is still 20, and a time window of in-synchronization monitoring may be 200 ms; and when in-synchronization evaluation is performed on link quality at a given time point, an amount of selected data is still 10, thereby ensuring that power consumption is reduced in a case in which accuracy of a monitoring result is not reduced. Certainly, in a case in which a link monitoring period is 20 ms, a time window of out-of-synchronization monitoring may still be 200 ms, and a time window of in-synchronization monitoring may still be 100 ms. In this way, an amount of data selected during evaluation is reduced, which reduces accuracy of the monitoring result to some extent, but can still reduce power consumption. In an actual application, which method is specifically used may be determined according to an actual status, which is not limited herein.

In this embodiment, a network side device sets an extended link monitoring period, a first extended time window, a second extended time window, and an extended minimum time interval for UE according to a device type indication message sent by the sending unit; then the monitoring unit monitors downlink quality of a serving cell on a physical layer by using the extended link monitoring period; and when a monitoring result satisfies a preset report condition, the sending unit sends an in-synchronization indication message or an out-of-synchronization indication message to an upper layer of the UE by using the extended minimum time interval. In this embodiment, because an extended link monitoring period is used to perform link monitoring, that is, a radio link monitoring period is increased and a monitoring frequency is reduced, power consumption and device costs can be reduced.

Figure 7:
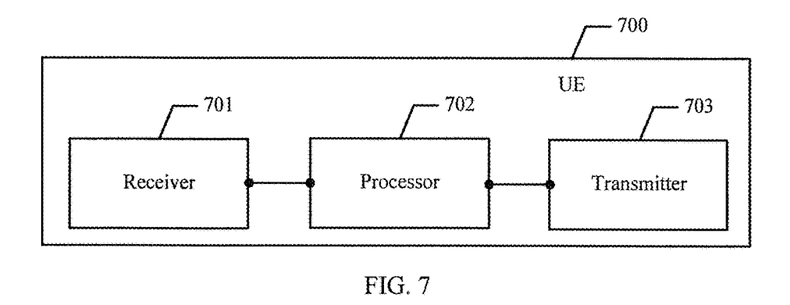
FIG. 7 is a schematic diagram of another embodiment of UE according to the present invention.

The following further describes the UE in the embodiments of the present invention. Referring to FIG. 7, in a specific implementation, UE 700 in this embodiment may be a terminal device, such as a mobile phone or a tablet computer. The UE 700 in this embodiment includes:

a processor 702, configured to monitor downlink quality of a serving cell on a physical layer of the UE by using an extended link monitoring period, where the extended link monitoring period is greater than an original link monitoring period; and a transmitter 703, configured to send an in-synchronization indication message or an out-of-synchronization indication message to an upper layer of the UE when a monitoring result of the processor 702 satisfies a preset report condition.

That the processor 702 monitors downlink quality of a serving cell on a physical layer by using an extended link monitoring period includes out-of-synchronization monitoring and in-synchronization monitoring, where when performing out-of-synchronization monitoring, the processor 702 evaluates downlink quality of the serving cell that is detected in a first extended time window by using the extended link monitoring period, to obtain a monitoring result, where a length of the first extended time window is greater than a length of a first original time window; and when performing in-synchronization monitoring, the processor 702 evaluates downlink quality of the serving cell that is detected in a second extended time window by using the extended link monitoring period, to obtain a monitoring result, where a length of the second extended time window is greater than a length of a second original time window.

A minimum time interval at which the transmitter 703 sends two consecutive in-synchronization indication messages or out-of-synchronization indication messages is an extended minimum time interval, and the extended minimum time interval is greater than an original minimum time interval.

In addition, the processor 702 is further configured to preset the extended link monitoring period, the first extended time window, the second extended time window, and the extended minimum time interval.

The transmitter 703 is further configured to report a device type indication message to a network side device; and the UE 700 may further include a receiver 701, configured to receive, from the network side device, the extended link monitoring period, the first extended time window, the second extended time window, and the extended minimum time interval that are set by the network side device according to the device type indication message reported by the transmitter 703 and that are sent to the UE by using a radio resource control RRC message.

The transmitter 703 may be specifically configured to: send the in-synchronization indication message or the out-of-synchronization indication message to the upper layer of the UE each time when a monitoring result of the processor 702 satisfies the preset report condition; or send the in-synchronization indication message or the out-of-synchronization indication message to the upper layer of the UE once when monitoring results of the processor 702 during a preset quantity of times of continuous monitoring are the same and all satisfy the preset report condition.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A radio link monitoring method, comprising:
monitoring, by user equipment (UE), downlink quality of a serving cell on a physical layer by using an extended link monitoring period, wherein the extended link monitoring period is greater than an original link monitoring period, and wherein monitoring the downlink quality of the serving cell on the physical layer by using the extended link monitoring period comprises:
out-of-synchronization monitoring and in-synchronization monitoring, wherein:
when performing out-of-synchronization monitoring, the UE evaluates downlink quality of the serving cell that is detected in a first extended time window by using the extended link monitoring period, to obtain the monitoring result, wherein a length of the first extended time window is greater than a length of a first original time window, and
when performing in-synchronization monitoring, the UE evaluates downlink quality of the serving cell that is detected in a second extended time window by using the extended link monitoring period, to obtain the monitoring result, wherein a length of the second extended time window is greater than a length of a second original time window; and
sending, by the UE, an in-synchronization indication message or an out-of-synchronization indication message to an upper layer of the UE when a monitoring result satisfies a preset report condition.

2. The method according to claim 1, wherein a minimum time interval at which the UE sends two consecutive in-synchronization indication messages or out-of-synchronization indication messages is an extended minimum time interval, and the extended minimum time interval is greater than an original minimum time interval.

3. The method according to claim 2, wherein the extended link monitoring period, the first extended time window, the second extended time window, and the extended minimum time interval are preset by the UE itself.

4. The method according to claim 2, wherein the extended link monitoring period, the first extended time window, the second extended time window, and the extended minimum time interval are set by a network side device according to a device type indication message reported by the UE and are notified to the UE by using a radio resource control (RRC) message.

5. User equipment (UE), comprising:
a processor, configured to:
monitor downlink quality of a serving cell on a physical layer of the UE by using an extended link monitoring period, wherein the extended link monitoring period is greater than an original link monitoring period;
monitor out-of-synchronization and monitor in-synchronization, wherein:
when performing out-of-synchronization monitoring, the processor is configured to evaluate downlink quality of the serving cell that is detected in a first extended time window by using the extended link monitoring period, to obtain the monitoring result, wherein a length of the first extended time window is greater than a length of a first original time window; and
when performing in-synchronization monitoring, the processor is configured to evaluate downlink quality of the serving cell that is detected in a second extended time window by using the extended link monitoring period, to obtain the monitoring result, wherein a length of the second extended time window is greater than a length of a second original time window; and
a transmitter, configured to send an in-synchronization indication message or an out-of-synchronization indication message to an upper layer of the UE when a monitoring result of the processor satisfies a preset report condition.

6. The UE according to claim 5, wherein a minimum time interval at which the transmitter sends two consecutive in-synchronization indication messages or out-of-synchronization indication messages is an extended minimum time interval, and the extended minimum time interval is greater than an original minimum time interval.

7. The UE according to claim 6, wherein the processor is further configured to:
preset the extended link monitoring period, the first extended time window, the second extended time window, and the extended urn time interval.

8. The UE according to claim 6, wherein:
the transmitter is further configured to report a device type indication message to a network side device; and the UE further comprises:
  a receiver configured to receive, from the network side device, the extended link monitoring period, the first extended time window, the second extended time window, and the extended minimum time interval that are set by the network side device according to the device type indication message reported by the transmitter and that are sent to the UE by using a radio resource control (RRC) message.

* * * * *